(12) United States Patent
Carroll

(10) Patent No.: US 6,682,294 B2
(45) Date of Patent: Jan. 27, 2004

(54) LOADING RAMP DECK

(75) Inventor: John B. Carroll, Irwin, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/077,212

(22) Filed: Feb. 15, 2002

(65) Prior Publication Data

US 2003/0156927 A1 Aug. 21, 2003

(51) Int. Cl.$^7$ .................................................. B60P 1/43
(52) U.S. Cl. ............................ 414/537; 193/38; 14/69.5
(58) Field of Search ........................... 414/537; 193/38; 14/69.5

(56) References Cited

U.S. PATENT DOCUMENTS

| | | | | |
|---|---|---|---|---|
| 2,906,212 A | * | 9/1959 | Hayes | 414/537 |
| 5,443,353 A | * | 8/1995 | Raymer | 414/537 |
| 5,467,493 A | * | 11/1995 | Alten | 14/69.5 |
| 5,802,983 A | * | 9/1998 | Manzini | 105/355 |

FOREIGN PATENT DOCUMENTS

| | | | | |
|---|---|---|---|---|
| DE | 3506425 | * | 9/1986 | |
| DE | 3632067 | * | 5/1988 | 414/537 |
| DE | 3701618 | * | 8/1992 | |
| EP | 1067070 | * | 6/2000 | |

* cited by examiner

Primary Examiner—Steven A. Bratlie
(74) Attorney, Agent, or Firm—James Ray & Associates

(57) ABSTRACT

A lightweight loading ramp deck and a method for forming such deck is provided. This loading ramp deck is capable of being used in a retractable loading ramp in the loading and unloading of intermodal cars. The loading ramp deck comprises a plurality of tubular members. Each of these tubular members comprises a first end, a second end, a top wall, a bottom wall, and longitudinal side walls. The top, bottom and side walls extend between the first and second ends. The tubular members are positioned such that the side walls are adjacently disposed with respect to each other and joined to form a loading deck which is inexpensive, lightweight, exceptionally strong and has excellent shear flow.

19 Claims, 3 Drawing Sheets

LOADING RAMP DECK

FIELD OF THE INVENTION

The invention generally relates to a loading ramp deck for intermodal cars. More particularly, the invention relates to a base platform for the retractable loading ramp deck of an intermodal railway vehicle.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

Intermodal transport, the movement of highway trailers by rail, has been known for many years. Typically, such trailers are loaded onto flat rail cars by well known devices such as cranes, high lift trucks, and/or wedge shaped ramps.

U.S. Pat. No. 4,973,206 to Engle shows a method and apparatus for loading and unloading semi-trailers on a train of flat cars by coupling the semi-trailers to power driven stanchions. Loading ramps are provided for enabling the stanchions to load the semi-trailers onto the flat cars.

Loading devices such as shown by Engle and other well known devices such as cranes and high lift trucks are expensive and are not readily available at all rail yards. Therefore, there is a need in the art for inexpensive, portable, lightweight loading ramps which can travel with the intermodal railway vehicle so that the trailers may be readily loaded and unloaded at a variety of locations. The ramp must be capable of withstanding a great amount of stress and have excellent torsional rigidity and shear flow.

OBJECTIVES OF THE INVENTION

It is, therefore, an objective of the invention to provide a loading ramp deck for an intermodal car which is lightweight, inexpensive, and exceptionally strong.

Another objective is to provide a loading ramp deck which has high torsional rigidity and bending strength.

Yet another objective is to provide a loading ramp deck which provides excellent shear flow due to its multi-cell cross-section.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the various embodiments of the invention summarized below.

A loading ramp deck for intermodal cars comprises a plurality of tubular members. Each of these tubular members comprises a first end, a second end, a top wall, a bottom wall and longitudinal side walls. The top, bottom and side walls extend between the first and second ends. The tubular members are positioned next to each other such that the longitudinal side walls are adjacently disposed with respect to each other. A joining means is provided for joining the plurality of tubular members to each other along their adjacently disposed longitudinal side walls to form a loading ramp deck having a predetermined width.

A method of forming the lightweight loading ramp deck comprises the steps of providing a plurality of tubular members. Each of the tubular members comprising a first end, a second end, a top wall, a bottom wall, and longitudinal side walls. The top, bottom and side walls extending between the first and second ends. Positioning the tubular members such that the longitudinal side walls are adjacently disposed with respect to each other and joining the tubular members to each other along their adjacently disposed longitudinal side walls to form a loading ramp deck having a predetermined width.

This loading ramp deck is capable of being used with a retractable loading ramp. The retractable loading ramp is attached to an intermodal car such that it may deployed as needed to enable loading of trailers onto the intermodal car at any location. The loading ramp deck may subsequently be retracted during movement of the car such as during transport of the trailers and once again deployed for unloading at the desired destination.

DETAILED DESCRIPTION OF THE INVENTION

Figure 1:
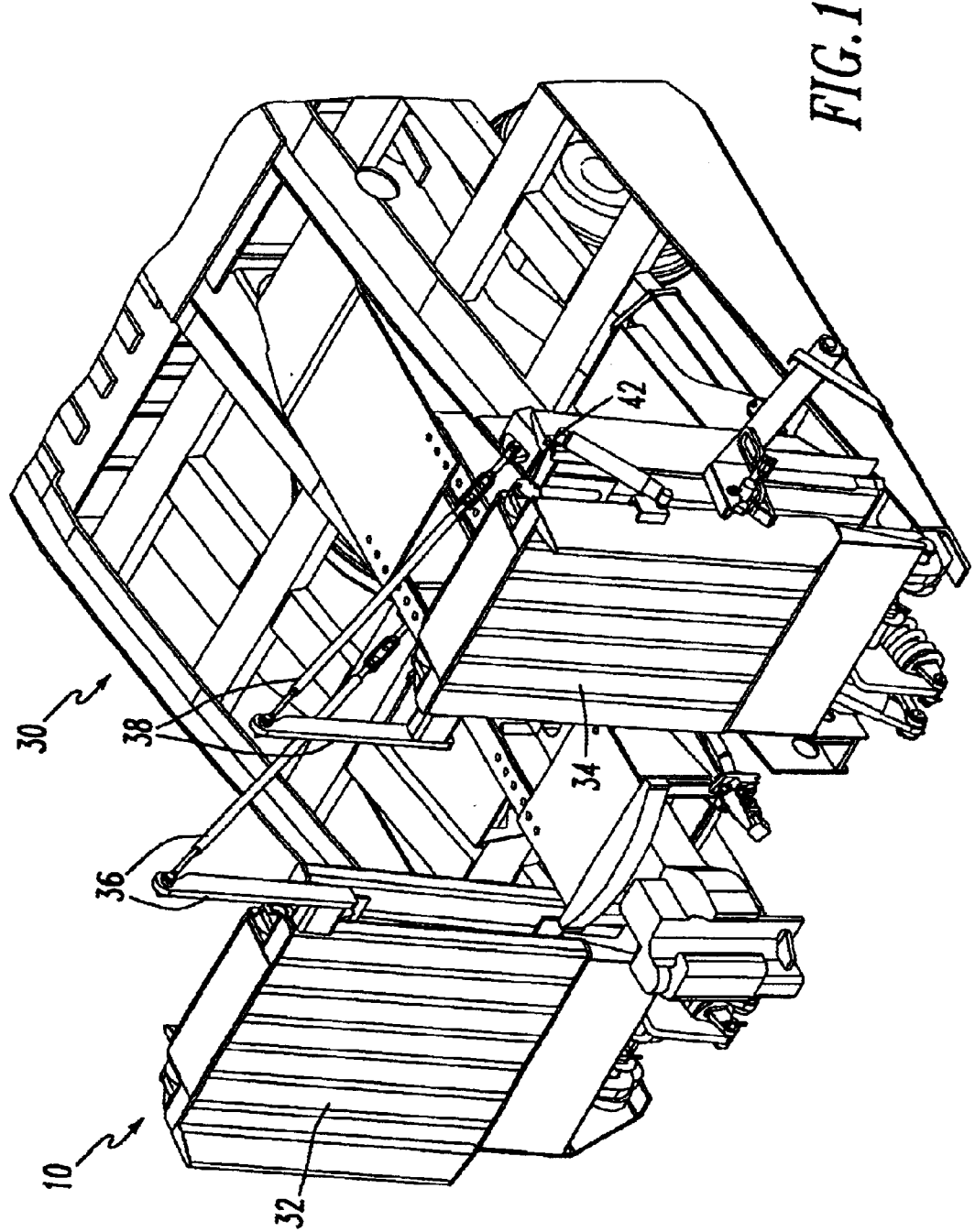
FIG. 1 is a perspective view of the retractable loading ramp including the ramp deck of the invention wherein the loading ramp is shown in a stowed position.

Before describing the invention in detail, the reader is advised that, for the sake of clarity and understanding, identical components having identical functions have been marked where possible with the same reference numerals in each of the Figures provided in this document.

Figure 2:
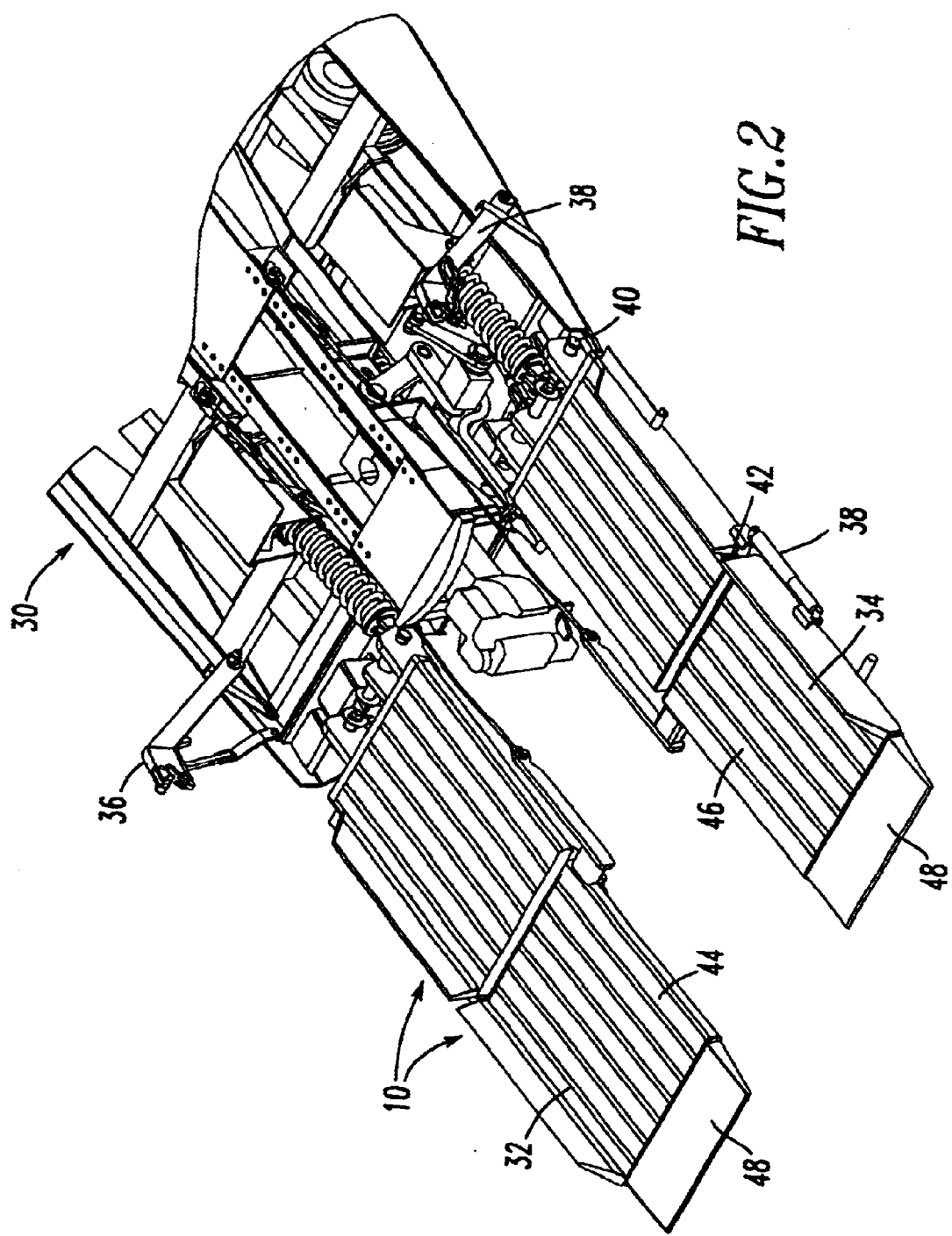
FIG. 2 is a perspective view of the retractable loading ramp including the ramp deck of the invention wherein the loading ramp is shown in a deployed position.

Referring now to FIG. 1, there is shown a perspective view of the retractable loading ramp, generally indicated as 10. The loading ramp is shown in a stowed position with respect to the railway vehicle. FIG. 2 shows the loading ramp in a deployed position.

Figure 3:
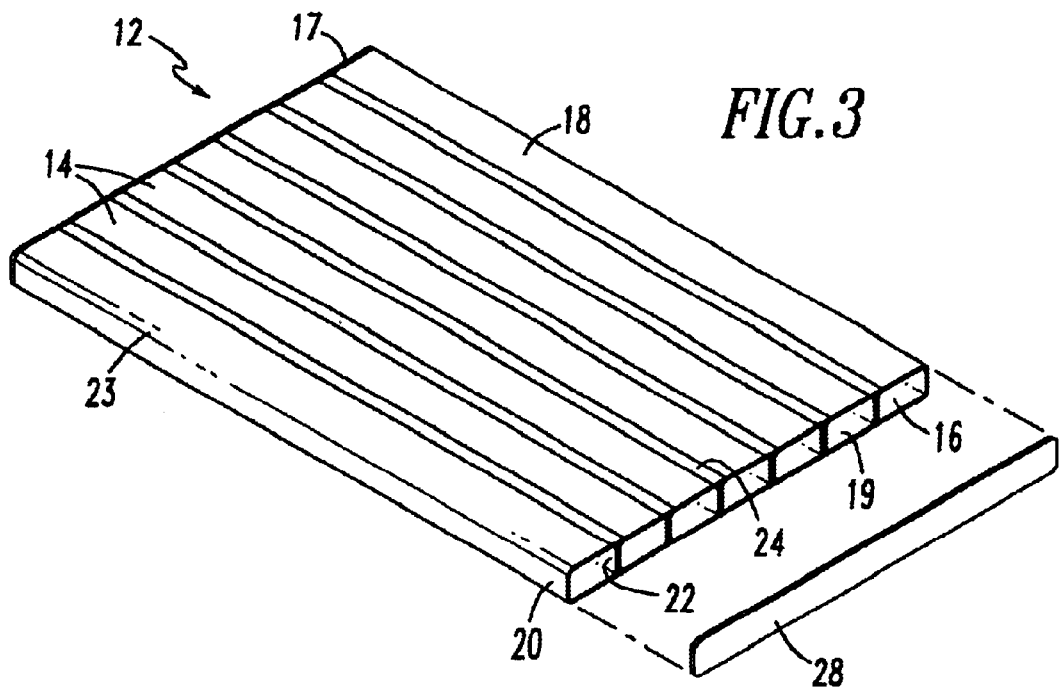
FIG. 3 is a partial sectional view of the inventive ramp deck shown in FIGS. 1 and 2.
Figure 4:
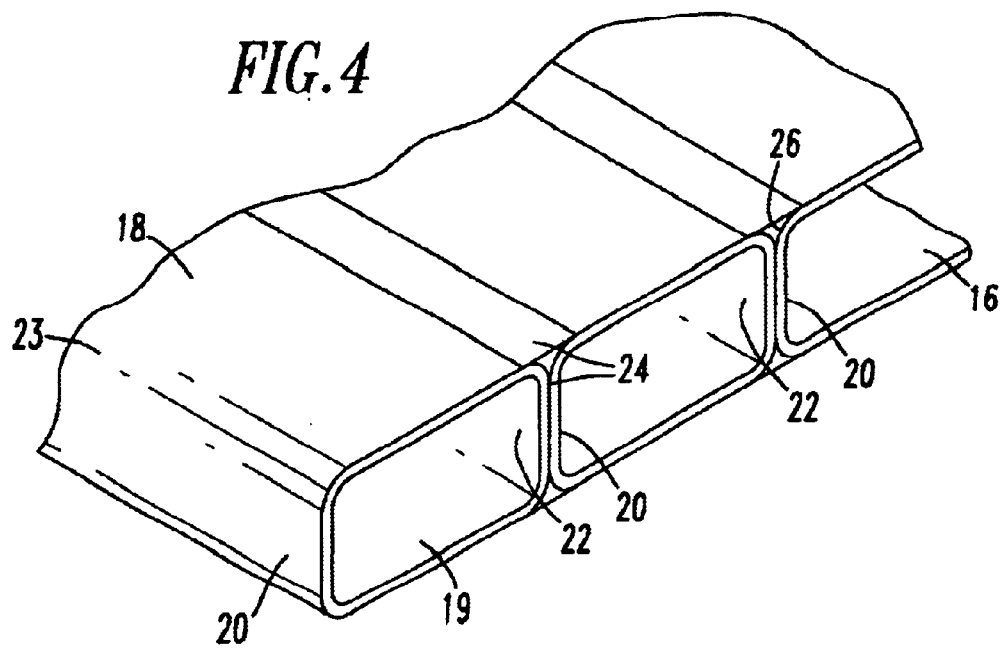
FIG. 4 is an enlarged portion of the ramp deck shown in FIG. 3.

The loading ramp deck itself, generally indicated as 12 is shown in detail in FIGS. 3 and 4. These figures show a plurality of tubular members 14, each of which comprise a first end 16, a second end 17, a top wall 18, a bottom wall 19, and longitudinal side walls 20, 22. Each of the top 18, bottom 19 and side walls 20,22 extend between the first and second ends 16, 17.

The tubular members 14 comprise thin walled rectangular tubing having rounded corners 23 and a wall thickness of approximately ¼ inch. The tubular members may be formed from any well know material having sufficient strength characteristics to enable loading of the trailers onto the intermodal car and which are capable of withstanding the environmental conditions of which the ramp deck will be exposed. Preferably, the tubular members are formed from steel. However, other materials may be used which include other well know metals and alloys, composites and plastics such as fiber reinforced plastics.

The tubular members 14 are positioned next to each other such that the side walls 20, 22 of the respective tubular members 14 are adjacently disposed with respect to each other.

Joining means 24 are provided for joining the plurality of tubular members 14 to each other along the adjacently disposed longitudinal side walls 20, 22 to form a loading ramp deck 12 having a predetermined width. The round corners 23 of the rectangular tubing 14 provide a natural "V" groove 26 that lends itself to automatic machine welding. It is preferable that the tubular members be welded along approximately the entire length of their longitudinal side walls.

Any well known welding technique may be used for joining the tubular members. One preferred welding technique is Submerged Metal Arc Welding or Subarc. Subarc welding is known for its increased productivity, deeper penetration, bead appearance and automation. The chemical components of the flux improve the weldability and may improve tensile strength as well. Subarc welding has been chosen in this instance for its deep penetration and complete fusion capabilities.

At least one of the first and second ends 16, 17 of the tubular members 14 are capped. Preferably both ends of the tubular members 14 are capped. Capping of the ends provides additional strength to the ramp deck, as well as corrosion protection.

The ends 16, 17 of the tubular members 14 may be capped with a pair of long thin cap members 28 which have a length substantially equal to the predetermined width of the loading ramp deck and capable of extending across the first and second ends 16, 17 of the joined tubular members 14. The cap member 28 may also be formed from steel. The cap members 28 are joined to the ends 16, 17 of the tubular members by any well known means such as welding and the like.

A method of forming this lightweight loading ramp deck 12 is provided which comprises the steps of providing the plurality of tubular members 14, each of which comprise a first end 16, a second end 17, a top wall 18, a bottom wall 19 and longitudinal side walls 20, 22. The top wall 18, the bottom wall 19 and the side walls 20, 22 extend between the first and second ends. Positioning the tubular members 14 side by side such that the longitudinal side walls 20, 22 are adjacently disposed with respect to each other. Joining the tubular members 14 to each other along their adjacently disposed longitudinal side walls 20, 22 to form a loading ramp deck 12 having a predetermined width.

This loading ramp deck 12 is capable of being utilized with a retractable loading ramp, 10 as shown in FIGS. 1 and 2. The retractable loading ramp being attached to an intermodal car, generally indicated as 30, such that it may deployed upon stopping of the car to enable loading of trailers onto the intermodal car at any location. The loading ramp 10 may subsequently be retracted before movement of the car 30 such as during transport of the trailers and once again deployed for unloading at the desired destination.

The retractable loading ramp 10, illustrated in FIGS. 1 and 2, comprises left and right sections 32, 34 that are loaded independently of each other and are operated by their own lift cylinders and linkages 36, 38. Each section attaches to the end of the car 30 by means of hinge pins 40 and folds in the middle at a hinged joint 42 to provide AAR Plate C clearance in the stowed position. In the deployed position, the lower halves 44, 46 of the ramp sections 32, 34 rest directly on the rail and any ballast, crossing material, etc. As the trailers are rolled onto the ramp, the tire loads are transferred through the ramp end tip 48 and middle hinge 42 to the rail, ballast, or crossing material and also onto the car body through the hinge pin connections.

Hinge levers are welded to the main deck 12 using reinforcing pads to minimize distortion from welding and also to provide even force distribution. The middle hinge joint 42 is comprised of hardened steel pins and internally lubricated, sintered steel bushings.

The main support deck 12 is constructed by welding long thin walled sections 14 of rectangular tubing together that are laid side by side. This structure offers substantial torsional rigidity and bending strength that is required in the loading ramp of the intermodal car, as well as, and good shear flow due to its multi-cell cross-section.

The presently preferred embodiment for carrying out the invention has been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, I/we secure for myself/ourselves by Letters Patent exclusive rights to all subject matter embraced by the following claims for the time prescribed by the Patent Act.

What is claimed is:

1. A loading ramp deck for use with a retractable loading ramp, said retractable loading ramp being attachable to intermodal cars, said loading ramp deck comprising:
    (a) a plurality, of tubular members, each of said tubular members comprising a first end, a second end, a top wall and a bottom wall, and longitudinal side walls, each of said top, bottom and side walls extending between said first and second ends, said plurality of tubular members being positioned such that said longitudinal sides walls are adjacently disposed with respect to each other;
    (b) joining means for joining said plurality of tubular members to each other, along said adjacently disposed longitudinal side walls to form a loading ramp deck having a predetermined width;
    (c) means for securing said loading ramp deck with said retractable loading ramp; and
    (d) at least one hinge pin for attaching said retractable loading rams to such intermodal car, said retractable loading ramp being attached to said intermodal car such that it may retracted before movement of said intermodal car and deployed upon stopping of said intermodal car to enable loading and/or unloading of said intermodal car.

2. A loading ramp deck as recited in claim 1 wherein said tubular members comprise thin walled rectangular tubing having rounded corners and a wall thickness of approximately ¼ inch.

3. A loading ramp deck as recited in claim 1 wherein said joining means comprises welded seams along substantially the entire length of said side walls of said tubular members.

4. A loading ramp deck as recited in claim 3 wherein said tubular members are formed from a metal.

5. A loading ramp deck as recited in claim 4 wherein said tubular members are formed from steel.

6. A loading ramp deck as recited in claim 3 wherein said welded seams are formed by subarc welding along approximately the entire length of said longitudinal side walls.

7. A loading ramp deck as recited in claim 1 wherein at least one of said first and second ends of said tubular members are capped.

8. A loading ramp deck as recited in claim 7 wherein both said first and second ends of said tubular members are capped.

9. A loading ramp deck as recited in claim 8 wherein said tubular members are capped with a pair of long thin cap members which have a length substantially equal to said predetermined width of said loading ramp deck, said cap members capable of extending across said first and second ends of said joined tubular members.

10. A loading ramp deck as recited in claim 9 wherein said cap members are welded to said ends of said joined tubular members.

11. A method of forming a lightweight loading ramp deck for use with a retractable loading ramp, said retractable loading ramp being attachable to an intermodal car, said method comprising the steps of:

(a) providing a plurality of tubular members, each of said tubular members comprising a first end, a second end, a top wall, a bottom wall, and longitudinal side walls, each of said top, bottom and side walls extending between said first and second ends;

(b) positioning said tubular members such that said longitudinal side walls are adjacently disposed with respect to each other;

(c) joining said plurality of tubular members to each other along said adjacently disposed longitudinal side walls to form a loading ramp deck having a predetermined width;

(d) securing said loading ramp deck with said retractable loading ramp; and (e) providing at least one hinge pin for attaching said retractable loading ramp to such intermodal car, said retractable loading ramp being attached to said intermodal car such that it may retracted before movement of said intermodal car and deployed upon stopping of said intermodal car to enable loading and/or unloading of said intermodal car.

12. A method of forming a lightweight loading ramp deck as recited in claim 11 wherein said tubular members comprise thin walled rectangular tubing having rounded corners.

13. A method of forming a lightweight loading ramp deck as recited in claim 11 wherein said step of joining said plurality of tubular members includes welding said members along substantially the entire length of their side walls.

14. A method of forming a lightweight loading ramp deck as recited in claim 13 wherein said tubular members are formed from a metal.

15. A method of forming a lightweight loading ramp deck as recited in claim 14 wherein said tubular members are formed from steel.

16. A method of forming lightweight loading ramp deck as recited in claim 13 wherein the step of welding said members along substantially the entire length of their side walls includes subarc welding.

17. A method of forming a lightweight loading ramp deck as recited in claim 11 including the step of positioning a cap member on at least one of said first and second ends of said tubular members.

18. A method of forming a lightweight loading ramp deck as recited in claim 17 including the step of positioning a cap member at both said first and second ends, said cap member comprising a long thin member having a length substantially equal to said predetermined width of said loading ramp deck and capable of extending across said first and second ends of said joined tubular members.

19. A method of forming a lightweight loading ramp deck as recited in claim 18 including the step of welding said cap members to said ends of said joined tubular members.

* * * * *